United States Patent
Guo et al.

(10) Patent No.: US 9,730,546 B2
(45) Date of Patent: Aug. 15, 2017

(54) CAPSULE COFFEE MACHINE

(71) Applicant: Guangdong Xinbao Electrical Appliances Holdings Co., Ltd., Foshan (CN)

(72) Inventors: Jiangang Guo, Foshan (CN); Yu Liu, Foshan (CN); Jinru Lin, Foshan (CN)

(73) Assignee: Guangdong Xinbao Electrical Appliances Holdings Co., Ltd. (CN)

( * ) Notice: Subject to any disclaimer, the term of this patent is extended or adjusted under 35 U.S.C. 154(b) by 352 days.

(21) Appl. No.: 14/423,567

(22) PCT Filed: Jul. 31, 2013

(86) PCT No.: PCT/CN2013/080506
§ 371 (c)(1),
(2) Date: Feb. 24, 2015

(87) PCT Pub. No.: WO2014/029264
PCT Pub. Date: Feb. 27, 2014

(65) Prior Publication Data
US 2015/0216349 A1    Aug. 6, 2015

(30) Foreign Application Priority Data

Aug. 24, 2012  (CN) .......................... 2012 1 0306470
Aug. 24, 2012  (CN) ..................... 2012 2 0426214 U (51) Int. Cl.
*A47J 31/40*    (2006.01)
*A47J 31/36*    (2006.01)

(52) U.S. Cl.
CPC ......... *A47J 31/407* (2013.01); *A47J 31/3633* (2013.01)

(58) Field of Classification Search
CPC ........................... A47J 31/407; A47J 31/3633
See application file for complete search history.

(56) References Cited

U.S. PATENT DOCUMENTS 4,724,752 A * 2/1988 Aliesch ............... A47J 31/3628
99/289 R
5,657,683 A * 8/1997 Sandei .................... A47J 31/54
99/287
(Continued)

FOREIGN PATENT DOCUMENTS

CN    101703363 A    5/2010
CN    201734530 U    2/2011
(Continued)

OTHER PUBLICATIONS

International Search Report for Application No. PCT/CN2013/080506 dated Nov. 7, 2013.

*Primary Examiner* — Sean Michalski
(74) *Attorney, Agent, or Firm* — Lerner, David, Littenberg, Krumholz & Mentlik, LLP (57) ABSTRACT

A capsule coffee machine includes a brewing seat and a brewing assembly. Rotating members are connected to the brewing assembly in a rotatable manner. Two detent members are hinged to the brewing seat and connected to a limit structure of a corresponding rotating member. When the brewing assembly and brewing seat move apart, each detent member is rotated inwardly by a corresponding rotating member so that a coffee capsule can be held between the detent members. When the brewing seat and assembly move towards each other, each detent member rotates outwardly to release the capsule into a making cavity of the brewing assembly. When the brewing assembly and seat are again moved apart, the coffee capsule having been brewed, drops from an interval between the brewing seat and brewing assembly and the detent members rotate back to their original position.

20 Claims, 5 Drawing Sheets

(56) References Cited

U.S. PATENT DOCUMENTS

| | | | | |
|---|---|---|---|---|
| 6,459,854 | B1* | 10/2002 | Yoakim | A47J 31/545 |
| | | | | 222/71 |
| 9,560,930 | B2* | 2/2017 | Fin | A47J 31/3633 |
| 2002/0088348 | A1* | 7/2002 | Cortese | A47J 31/3638 |
| | | | | 99/295 |
| 2008/0050488 | A1* | 2/2008 | Koeling | A47J 31/0678 |
| | | | | 426/431 |
| 2014/0318381 | A1* | 10/2014 | Talon | A47J 31/4482 |
| | | | | 99/295 |
| 2014/0345470 | A1* | 11/2014 | Venturi | A47J 31/3633 |
| | | | | 99/283 |
| 2016/0150907 | A1* | 6/2016 | Bolognese | A47J 31/3633 |
| | | | | 99/289 R |
| 2016/0174750 | A1* | 6/2016 | Wang | A47J 31/3633 |
| | | | | 99/289 R |

FOREIGN PATENT DOCUMENTS

| | | | |
|---|---|---|---|
| CN | 201822642 | U | 5/2011 |
| CN | 102813458 | A | 12/2012 |
| CN | 202891617 | U | 4/2013 |
| WO | 2012019544 | A1 | 2/2012 |

* cited by examiner

CAPSULE COFFEE MACHINE

CROSS-REFERENCE TO RELATED APPLICATIONS

The present application is a national phase entry under 35 U.S.C §371 of International Application No. PCT/CN2013/080506, filed Jul. 31, 2013, which claims priority to Chinese Application Nos. CN 201210306470.1, filed Aug. 24, 2012; and CN 201220426214.1, filed Aug. 24, 2012, all of which are hereby incorporated herein by reference.

FIELD OF THE INVENTION

The present disclosure relates to a coffee machine, and particularly to a capsule coffee machine.

BACKGROUND OF THE INVENTION

The capsule coffee machine is becoming more and more popular because it is convenient to operate and the coffee brewed by this kind of machine has a good taste. Since the capsule coffee machine is relatively widely used especially in office places and leisure places, it would bring inconvenience to the subsequent users if the capsule cannot drop automatically after the coffee is brewed. Moreover, if the capsule having been brewed is taken out of the coffee machine manually, the capsule coffee machine would get broken easily due to the different degree of proficiency of different users.

In order to take the capsule having been brewed out of the coffee machine without manual labor, a capsule coffee machine provided with automatic capsule-dropping structure is proposed. A brewing seat of the capsule coffee machine is provided with a left slider and a right slider, which can slide towards the two sides of the brewing seat respectively. The left slider and the right slider each is provided with a slope. When a brewing head abuts against the slopes of the left slider and the right slider, the brewing head forces the left slider and the right slider move towards the two sides respectively, and thus the capsule can enter into the brewing head. After the coffee is brewed, the brewing head moves backwards, and the capsule is released from the brewing head and then drops into a capsule box automatically. However, the structure of such coffee machine with automatic capsule-dropping function in the prior art is complex. Furthermore, since the left slider and the right slider move towards the two sides respectively during operation, the left slider and the right slider would protrude from the body of the capsule coffee machine, which would result in a relatively large occupying space thereof, and would affect the normal use of the coffee machine.

SUMMARY OF THE INVENTION

The present disclosure aims to provide a capsule coffee machine which can enable the brewed capsule to be dropped automatically. Such capsule coffee machine has a simple and compact structure, a small occupying space, and is convenient to use.

Accordingly, the present disclosure provides a capsule coffee machine, comprising a brewing seat and a brewing assembly which are moveable with respect to each other, the machine further comprising:

two rotating members arranged on the two sides of the brewing assembly respectively, one end of each rotating member being connected with the brewing assembly in a rotatable manner; and two detent members hinged to the two sides of the brewing seat respectively, one end of each detent member being connected with a limit structure provided at the other end of a corresponding rotating member located on the same side in a moveable manner, wherein when the brewing assembly and the brewing seat are moving apart from each other, each detent member is rotated inwardly by a corresponding rotating member located at the same side respectively, so that a coffee capsule can be held between the two detent members;

when the brewing assembly and the brewing seat are moving towards each other, each detent member is rotated outwardly by the corresponding rotating member to release the coffee capsule, so that the coffee capsule enters into a making cavity of the brewing assembly to brew coffee; and when the brewing assembly and the brewing seat are moving apart from each other again, the coffee capsule having been brewed will drop from an interval between the brewing seat and the brewing assembly as the interval increases, and each detent member is rotated inwardly by the corresponding rotating member to its original position.

Compared with the prior art, the capsule coffee machine of the present disclosure has the following advantages. When the brewing seat and the brewing assembly of the capsule coffee machine of the present disclosure are moving apart from each other and thus the interval formed therebetween is opened, the coffee capsule can be put between the two detent members conveniently and fixed in the brewing seat. When the brewing seat and the brewing assembly are moving towards each other and thus the interval therebetween is closed, the two detent members are rotated outwardly by the two rotating members, so that the coffee capsule is pushed into the making cavity of the brewing assembly, and then water is added into the making cavity and the coffee capsule is brewed. After the coffee capsule is brewed, the brewing seat and the brewing assembly move apart from each other and thus the interval therebetween is opened, so that the brewed capsule is released from the making cavity. The coffee capsule will drop automatically by the action of the gravity since the holding action of the detent member exists no longer. Then, the detent members are rotated inwardly by the rotating members to their original positions, and are ready for next brewing. Since the two rotating members are arranged outside the brewing seat and the brewing assembly, no complicated structure is necessary to cooperate with the two rotating members, and thus the structure of the coffee machine of the present disclosure is simpler. Moreover, when the rotating member rotates, the rotation range thereof is limited strictly by the detent member connected with the limit structure, so that the structure of the coffee machine is compact and the occupying space thereof is small. In the capsule coffee machine of the present disclosure, the brewing of the coffee capsule and the automatic dropping of the capsule can be accomplished only through three procedures of "opening", "closing" and "opening". Therefore, the coffee machine is convenient and simple to operate. In addition, the detent members can hold the coffee capsule of different shapes, and thus are suitable for a wide application scope.

As an improvement of the present disclosure, the making cavity of the brewing assembly is provided therein with a resilient member used for popping up the coffee capsule. The capsule can be released from the making cavity more easily and more quickly through providing a resilient member for popping up the coffee capsule.

As a preferred embodiment of the present disclosure, said resilient member is configured to be compressed when the brewing assembly and the brewing seat are moving towards each other, and to pop up the coffee capsule through restoring force when the brewing assembly and the brewing seat are moving apart from each other again. The resilient member can be used for preventing the coffee capsule from being jammed in the making cavity, so as to avoid the circumstance that the capsule cannot drop automatically when the brewing assembly and the brewing seat are moving apart from each other again.

As another improvement of the present disclosure, a relative opening-closing movement between the brewing assembly and the brewing seat is driven by a driving assembly, which comprises a handle. One end of said handle is a free end, and a middle part of the other end is connected with a hinge block, which is connected with the brewing seat through a first shaft. The other end of said handle is connected with one end of a first connecting rod through a second shaft, the other end of said first connecting rod is connected with one end of each of the two second connecting rods arranged at each of the two sides of the brewing seat respectively through a third shaft, and the other end of each of the two second connecting rods is connected with the brewing assembly. The brewing assembly can move with respect to the brewing seat through the handle, the first connecting rod and the second connecting rod, so as to achieve the purpose of opening and closing the capsule coffee machine of the present disclosure.

As another improvement of the present disclosure, each second connecting rod is connected with the third shaft though a connecting block, one end of said connecting block being connected with the third shaft in a rotatable manner, and the other end of said connecting block being hinged to the second connecting rod. The connecting block is provided for connecting the second connecting rod, and the cooperation thereof can be realized through the rotation of the connecting block when the brewing assembly moves with respect to the brewing seat. Such structure of the capsule coffee machine is simpler, more flexible and durable compared with the case that a resilient member is provided to replace the second connecting rod therein.

As another improvement of the present disclosure, the limit structure of said rotating member is a waist-shaped hole, and the other end of said detent member is provided with a slipping shaft which can move in the waist-shaped hole. The detent member being connected with the rotating member in a moveable manner means that the slipping shaft is engaged with the waist-shaped hole in a moveable manner, wherein the slipping shaft can move from one end to another end of the waist-shaped hole.

As another improvement of the present disclosure, said detent member is C-shaped, and is provided with a holding groove used for holding the coffee capsule. The coffee capsule is provided with a flange, and said holding groove is used for holding the flange of the coffee capsule, so that the coffee capsule can be held conveniently once it is placed.

As another improvement of the present disclosure, each of the two sides of the upper end of said brewing assembly is provided with a fixing block respectively, each fixing block being connected with a first pin, with which said rotating member is connected in a rotatable manner. The rotating member is connected with the brewing assembly through the first pin provided on the fixing block. With the above structure, the connection is convenient and can be realized easily. Moreover, the brewing assembly cannot be damaged easily when the rotating member moves therein.

As another preferred embodiment of the present disclosure, when the brewing assembly and the brewing seat are moving apart from each other, the first pin follows the brewing assembly and moves apart from the brewing seat, and each detent member is rotated inwardly when a corresponding rotating member rotates inwardly about the first pin. When the brewing assembly and the brewing seat are moving towards each other, the first pin follows the brewing assembly and moves towards the brewing seat, and each detent member is rotated outwardly when a corresponding rotating member rotates outwardly about the first pin. And when the brewing assembly and the brewing seat are moving apart from each other again, the first pin follows the brewing assembly and moves apart from the brewing seat again, and each detent member is rotated inwardly to its original position when a corresponding rotating member rotates inwardly about the first pin.

As another improvement of the present disclosure, said brewing seat is provided with two limit blocks for limiting said two detent members respectively, each of said limit blocks being connected with a second pin, which is sheathed with a middle part of said detent member that is connected with the second pin in a rotatable manner. The rotating angle of the detent member can be limited by the limit block, so that the detent member can be rotated to its original position conveniently.

As another improvement of the present disclosure, said second pin is sheathed with a torsion spring for resetting the detent member, one end of said torsion spring being connected with the limit block, and the other end of said torsion spring being connected with the holding groove of the detent member. The detent member can be rotated to its original position by the restoring force of the torsion spring.

As another preferred embodiment of the present disclosure, when the brewing assembly and the brewing seat are moving apart from each other, each detent member rotates inwardly about the second pin to the detent location and thus is limited by the inner side of the corresponding limit block. When the brewing assembly and the brewing seat are moving towards each other, each detent member rotates outwardly about the second pin, the torsion spring is compressed, and each detent member is limited by the outer side of the corresponding limit block. And when the brewing assembly and the brewing seat are moving apart from each other again, each detent member rotates inwardly about the second pin to its original position and is limited by the inner side of the corresponding limit block by the action of the restoring force of the corresponding torsion spring and rotating member.

LIST OF REFERENCE SIGNS

1—handle
2—hinge block
3—the first shaft
4—the second shaft
5—the first connecting rod
6—the third shaft
7—the second connecting rod
8—connecting block
9—brewing seat
10—brewing assembly
10.1—making cavity
11—rotating member
11.1—waist-shaped hole
12—coffee capsule
13—guiding shaft
14—detent member
14.1—holding groove
14.2—slipping shaft
15—resilient member
16—fixing block
17—the first pin
18—limit block
19—torsion spring
20—the second pin

DETAILED DESCRIPTION OF THE EMBODIMENTS

The present disclosure will be further explained hereinafter in combination with the accompanying drawings and specific embodiments.

Figure 6:
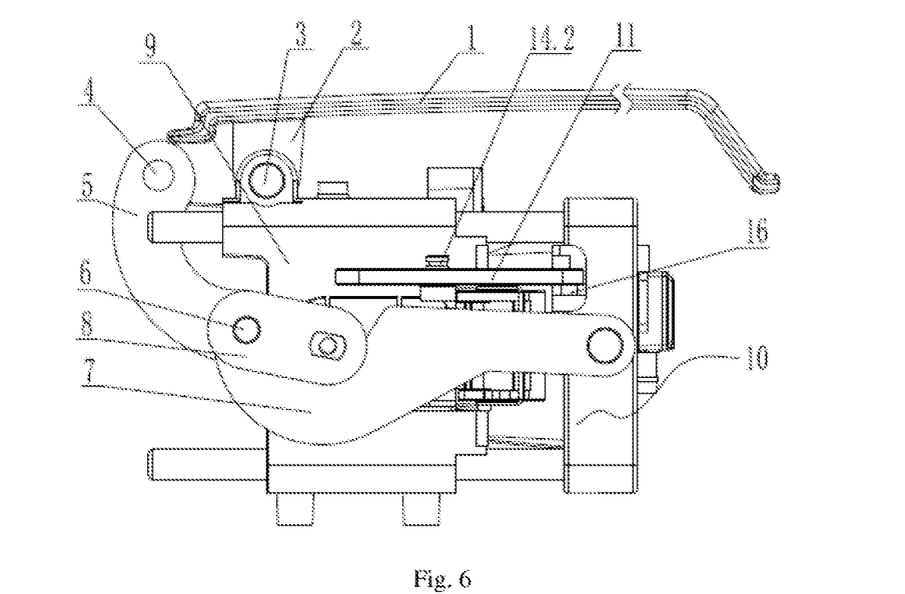
FIG. 6 is a structural diagram of the capsule coffee machine as shown in FIG. 1 when the coffee capsule is brewed therein.
Figure 7:
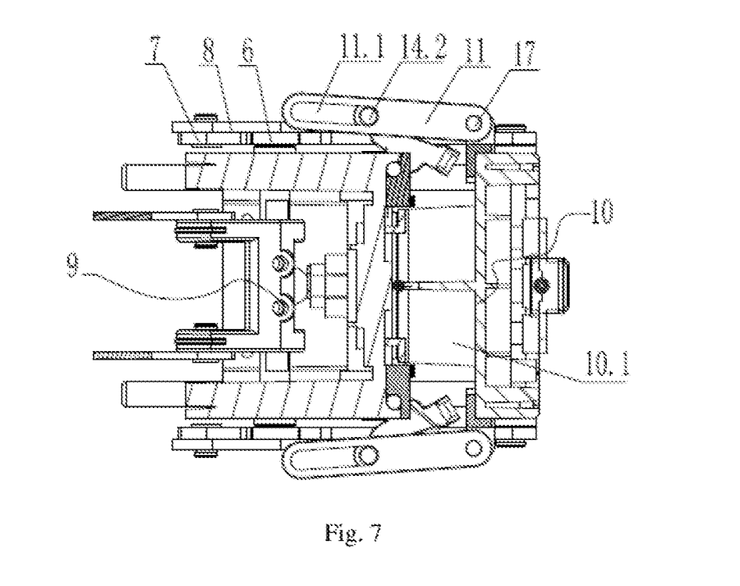
FIG. 7 is a sectional view of the capsule coffee machine as shown in FIG. 6.
Figure 8:
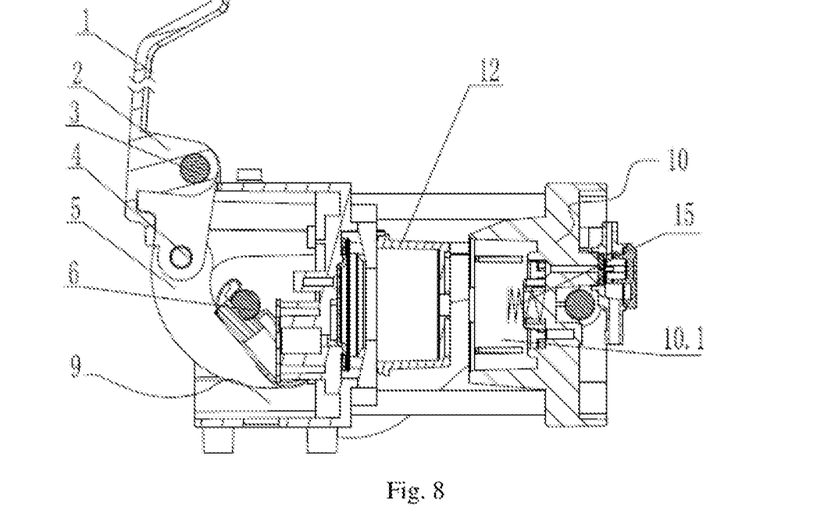
FIG. 8 is a structural diagram of the capsule coffee machine as shown in FIG. 1 when the machine is opened again and the capsule thereof drops.
Figure 9:
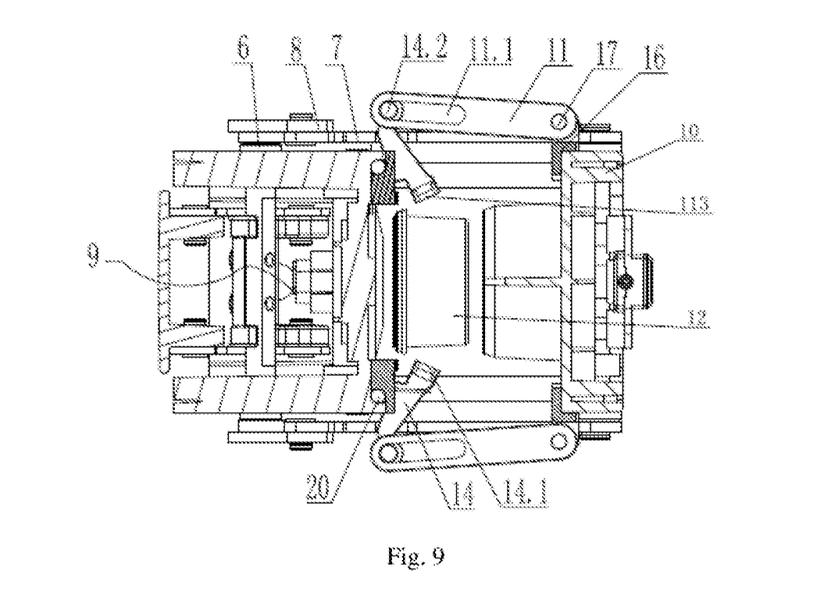
FIG. 9 is a sectional view of the capsule coffee machine as shown in FIG. 8.

FIG. 1 to FIG. 9 show a specific embodiment of the capsule coffee machine of the present disclosure. According to the present embodiment, the capsule coffee machine of the present disclosure comprises a brewing seat 9 and a brewing assembly 10, which are connected with each other by four guiding shafts 13 and can move with respect to each other through the action of a driving assembly. As shown in FIG. 8 and FIG. 9, the brewing assembly 10 is provided with a making cavity 10.1 for accommodating a coffee capsule 12, and the making cavity 10.1 is provided with a resilient member 15 used for popping up the brewed coffee capsule 12. The brewing seat 9 is provided with a hot water channel and a one-way valve used for brewing the coffee capsule 12.

Figure 1:
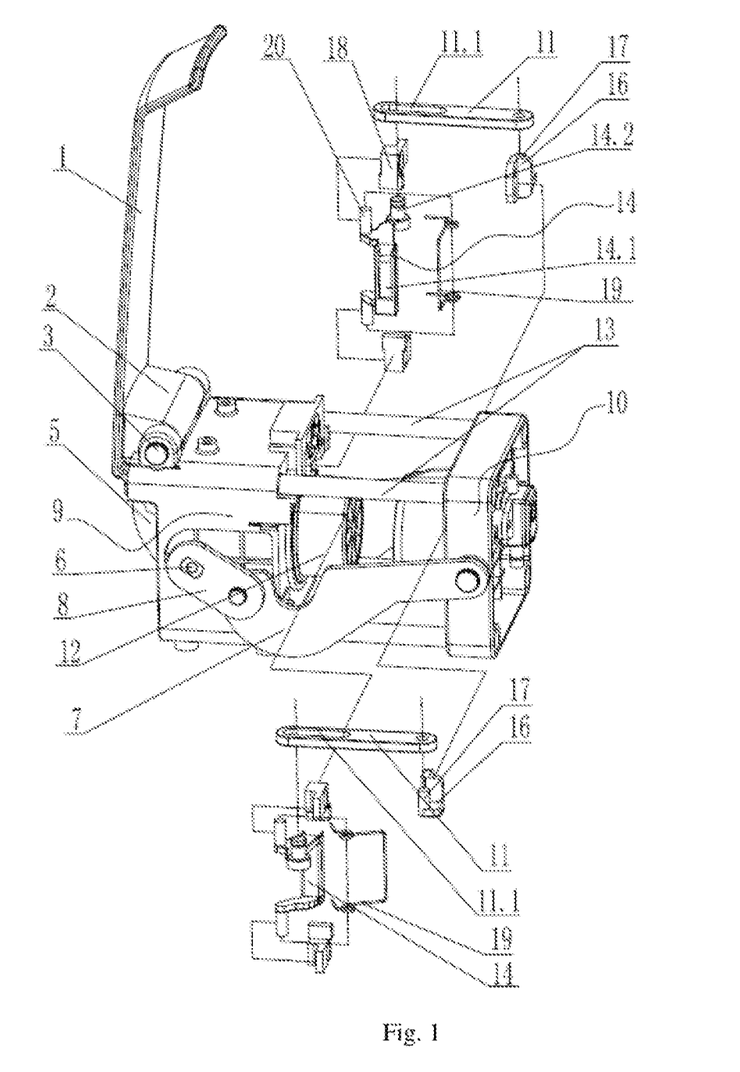
FIG. 1 schematically shows the structure of a capsule coffee machine according to the present disclosure in an exploded view.

The capsule coffee machine of the present disclosure further comprises two rotating members 11 located on the two sides of the brewing assembly 10 respectively and two detent members 14 connected with the two rotating members 11 respectively. In the present embodiment, as shown in FIG. 1, the coffee capsule 12 is provided with a flange, and the detent member 14, which is C-shaped, is provided with a holding groove 14.1 used for holding the flange of the coffee capsule 12.

Figure 2:
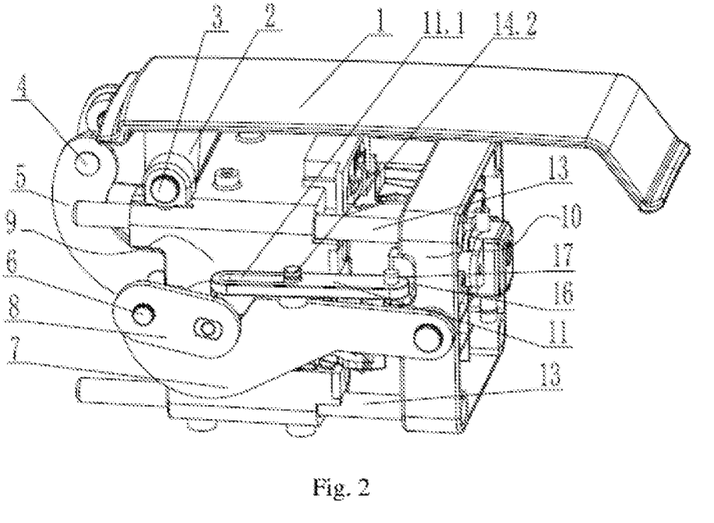
FIG. 2 is a structural diagram of the capsule coffee machine as shown in FIG. 1 in a closed state.
Figure 3:
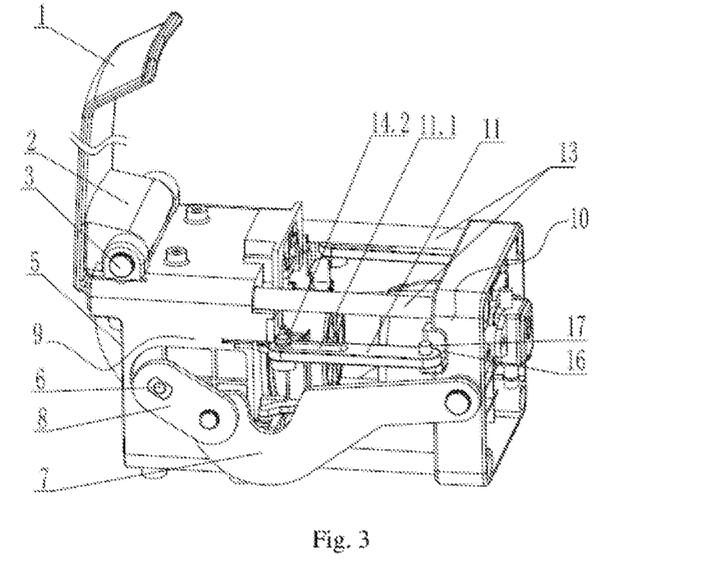
FIG. 3 is a structural diagram of the capsule coffee machine as shown in FIG. 1 in an open state.

According to the present disclosure, one end of each of the two rotating members 11 is connected with the brewing assembly 10 in a rotatable manner. In the present embodiment, as shown in FIG. 2 and FIG. 3, the rotating member 11 is connected with the brewing assembly 10 in a rotatable manner means that each of the two sides of the upper end of said brewing assembly 10 is provided with a fixing block 16 respectively, each said fixing block 16 being connected with a first pin 17, with which said rotating member 11 is connected in a rotatable manner. When the brewing assembly 10 and the brewing seat 9 are moving apart from each other, the first pin 17 follows the brewing assembly 10 and moves apart from the brewing seat 9, and each detent member 14 is rotated inwardly when a corresponding rotating member 11 rotates about the first pin 17 inwardly. When the brewing assembly 10 and the brewing seat 9 are moving towards each other, the first pin 17 follows the brewing assembly 10 and moves towards the brewing seat 9, and each detent member 14 is rotated outwardly when a corresponding rotating member 11 rotates about the first pin 17 outwardly. And when the brewing assembly 10 and the brewing seat 9 are moving apart from each other again, the first pin 17 follows the brewing assembly 10 and moves apart from the brewing seat 9 again, and each detent member 14 is rotated inwardly to its original position when a corresponding rotating member 11 rotates about the first pin 17 inwardly.

In one embodiment of the present disclosure not shown in the accompanying drawings, said rotating member 11 is hinged to the brewing assembly 10.

In the present embodiment, the two detent members 14 are hinged to the two sides of the brewing seat 9 respectively, and one end of each detent member 14 is connected with a waist-shaped hole 11.1, which is provided on one end of a corresponding rotating member 11 and used for limiting the detent member 14 in a moveable manner. The waist-shaped hole 11.1 is a through hole and the cross section thereof is formed by two arcs at the two ends and two straight lines connecting the two arcs.

Figure 5:
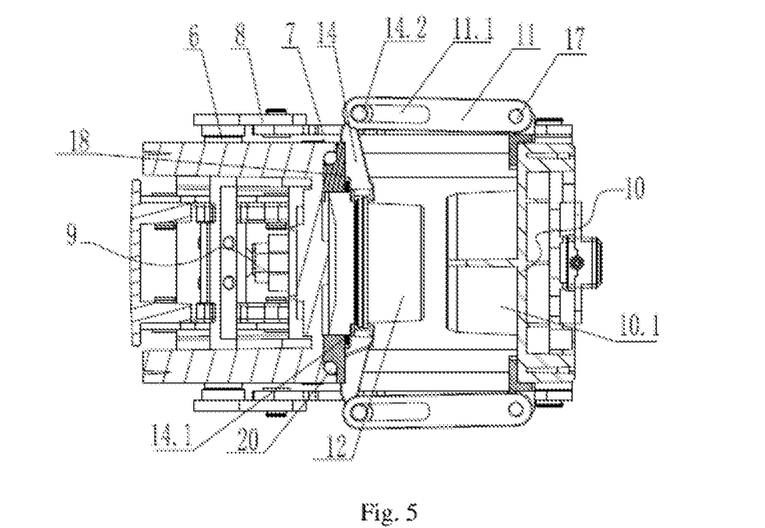
FIG. 5 is a sectional view of the capsule coffee machine as shown in FIG. 4.

As shown in FIG. 5, FIG. 7, and FIG. 9, the other end of said detent member 14 is provided with a slipping shaft 14.2 cooperating with the waist-shaped hole 11.1. In the present embodiment, the movements of the two slipping shafts 14.2 and the waist-shaped holes 11.1 comprise two kinds of movements, i.e., each slipping shaft 14.2 rotates in the corresponding waist-shaped hole 11.1, and each slipping shaft 14.2 slips back and forth in the corresponding waist-shaped hole 11.1. In other words, the slipping shaft 14.2 can not only cooperate with the waist-shaped hole 11.1 and convey the rotating force of the rotating member 11 to the detent member 14, so that the detent member 14 can be rotated by the rotating member 11, but also move from one end to another end in the waist-shaped hole 11.1.

FIG. 5 is a structural diagram of the capsule coffee machine when the brewing assembly 10 starts to move towards the brewing seat 9 after the coffee capsule 12 is placed therein. The detent members 14, with the coffee capsule 12 held therebetween, are rotated outwardly by the rotating members 11, and each slipping shaft 14.2 of the detent member 14 is located at one end of the corresponding waist-shaped hole 11.1 far from the brewing assembly 10.

FIG. 7 is a structural diagram of the capsule coffee machine when the coffee capsule 12 is brewed therein after the brewing assembly 10 has moved close to the brewing seat 9. When the brewing assembly 10 is moving towards the brewing seat 9, each detent member 14 is further rotated outwardly to a certain location by the corresponding rotating member 11 connected with the brewing assembly 10. The coffee capsule 12 is separated from the two detent members 14, and is put into the brewing assembly 10 to brew coffee. The brewing assembly 10 continues to move towards the brewing seat 9, and the resilient member 15 in the making cavity 10.1 is compressed gradually. When the brewing assembly 10 touches the brewing seat 9, the coffee capsule 12 is brewed by the joint action of the brewing seat 9 and the brewing assembly 10. At this time, the amount of compression of the resilient member 15 reaches the maximum value, and each slipping shaft 14.2 of the detent member 14 has moved to the other end of the corresponding waist-shaped hole 11.1 near to the brewing assembly 10 from the end of the corresponding waist-shaped hole 11.1 far from the brewing assembly 10.

FIG. 9 is a structural diagram of the capsule coffee machine when the brewing assembly 10 is moving apart from the brewing seat 9 after the coffee capsule 12 is brewed. When the brewing assembly 10 is moving apart from the brewing seat 9, the resilient member 15 in the making cavity 10.1 restores gradually, and the brewed coffee capsule 12 is popped up by the action of the resilient force. The brewing assembly 10 continues to move apart from the brewing seat 9, so that the interval therebetween becomes larger gradually. When the interval is large enough, the brewed coffee capsule 12 will drop automatically from the interval by the action of the gravity of itself. When the interval between the brewing assembly 10 and the brewing seat 9 reaches its maximum value, the detent members 14 are rotated inwardly by the rotating members 11 to their original positions, and thus ready for next brewing.

In the present embodiment, as shown in FIGS. 1 to 4, FIG. 6, and FIG. 8, said driving assembly comprises: a handle 1. One end of said handle 1 is a free end, and a middle part of the other end is connected with a hinge block 2, which is connected with the brewing seat 9 through a first shaft 3. The other end of said handle 1 is connected with one end of a first connecting rod 5 through a second shaft 4, the other end of said first connecting rod 5 is connected with one end of each of the two second connecting rods 7 arranged at each of the two sides of the brewing seat 9 respectively through a third shaft 6, and the other end of each of the two second connecting rods 7 is connected with the brewing assembly 10.

Figure 4:
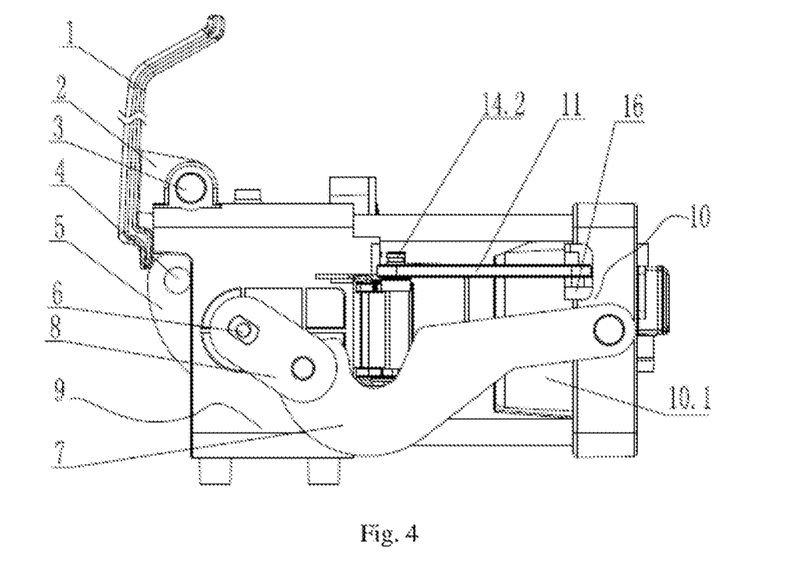
FIG. 4 is a structural diagram of the capsule coffee machine as shown in FIG. 1 when the coffee capsule is placed therein.

As shown in FIG. 2 and FIG. 4, each second connecting rod 7 is connected with the third shaft 6 though a connecting block 8, one end of said connecting block 8 is connected with the third shaft 6 in a rotatable manner, and the other end of said connecting block 8 is hinged to the second connecting rod 7.

As shown in FIG. 1, said brewing seat 9 is provided with two limit blocks 18 for limiting said two detent members 14 respectively. Each of said limit blocks 18 is connected with a second pin 20, which is sheathed with a middle part of said detent member 14 that is connected with the second pin 20 in a rotatable manner. In the present embodiment, each limit block 18 is mainly used for limiting the inward and outward rotating angle of the corresponding detent member 14.

As shown in FIG. 1, said second pin 20 is sheathed with a torsion spring 19 for resetting the detent member 14. One end of said torsion spring 19 is connected with the limit block 18, and the other end of said torsion spring 19 is connected with the detent member 14. Under the resilient force of the torsion spring 19, the coffee capsule 12, once being held therein by the cooperation of the two detent members 14, cannot deflect or drop easily, and the detent members 14 can be rotated to their original positions more easily and more quickly.

When the brewing assembly 10 and the brewing seat 9 are moving apart from each other, each detent member 14 rotates inwardly about the second pin 20 to the detent location and is limited by the inner side of the corresponding limit block 18. When the brewing assembly 10 and the brewing seat 9 are moving towards each other, each detent member 14 rotates outwardly about the second pin 20 to compress the torsion spring 19, and is limited by the outer side of the corresponding limit block 18. And when the brewing assembly 10 and the brewing seat 9 are moving apart from each other again, each detent member 14 rotates inwardly about the second pin 20 to its original position and is limited by the inner side of the corresponding limit block 18 by the action of the restoring force of the corresponding torsion spring 19 and rotating member 11.

As shown in FIG. 3, FIG. 4, and FIG. 5, the working principle of the capsule coffee machine of the present disclosure is as follows. First, the handle 1 is lifted, and the driving assembly enables that the brewing assembly 10 moves apart from the brewing seat 9, so that the capsule coffee machine is opened. Second, the coffee capsule 12 is put into the holding grooves 14.1 of the two detent members 14 of the brewing seat 9 from the above, and the coffee capsule 12 is held therein. Then, the handle 1 is pressed, and the brewing assembly 10 moves towards the brewing seat 9 until the interval therebetween disappears. When the brewing assembly 10 is moving towards the brewing seat 9, the two detent members 14 are rotated outwardly by the rotating members 11. The coffee capsule 12 is released when the rotating members 11 rotate outwardly to a certain angle, and then moved into the making cavity 10.1 of the brewing assembly 10. When the brewing assembly 10 further moves towards the brewing seat 9, the resilient member 15 in the making cavity 10.1 is compressed, until the brewing assembly 10 touches the brewing seat 9, i.e., the gap therebetween is closed. When the gap between the brewing assembly 10 and the brewing seat 9 is closed, each detent member 14 rotates outwardly to the largest angle and is limited by the corresponding limit block 18, and each slipping shaft 14.2 moves to one end of the corresponding waist-shaped hole 11.1 near to the brewing assembly 10. As shown in FIG. 6 and FIG. 7, when the gap between the brewing assembly 10 and the brewing seat 9 is closed, the coffee capsule 12 enters into the making cavity 10.1 of the brewing assembly 10 to brew coffee, and the resilient member 15 is compressed to the largest extent. After the coffee is brewed, the handle 1 is lifted again, and the driving assembly enables that the brewing assembly 10 moves apart from the brewing seat 9, so that the capsule coffee machine is opened again. Each detent member 14 is rotated inwardly to its original position by the action of the corresponding rotating member 11 and torsion spring 19, and limited by the corresponding limit block 18 again for next brewing. When the brewing assembly 10 is moving apart from the brewing seat 9, the resilient member 15 in the brewing assembly 10 restores gradually, and the coffee capsule 12, with only a capsule left therein after brewing, is popped up from the making cavity 10.1 by the action of the resilience. The coffee capsule 12 drops automatically from the capsule coffee machine through the interval between the brewing seat 9 and the brewing assembly 10 by the action of the gravity of itself, as shown in FIG. 8 and FIG. 9. The capsule coffee machine of the present disclosure is easy and convenient to operate, and can be used for brewing the coffee capsule 12 of different shapes.

The present disclosure is explained in detail in combination with specific examples hereinabove, but it is understandable that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A capsule coffee machine, comprising a brewing seat and a brewing assembly which are moveable with respect to each other, the machine further comprising:
   two rotating members arranged on the two sides of the brewing assembly respectively, one end of each rotating member being connected with the brewing assembly in a rotatable manner; and
   two detent members hinged to the two sides of the brewing seat respectively, one end of each detent member being connected with a limit structure provided at the other end of a corresponding rotating member located on the same side in a moveable manner,
   wherein when the brewing assembly and the brewing seat are moving apart from each other, each detent member is rotated inwardly by a corresponding rotating member located at the same side respectively, so that a coffee capsule can be held between the two detent members;
   when the brewing assembly and the brewing seat are moving towards each other, each detent member is rotated outwardly by the corresponding rotating member to release the coffee capsule, so that the coffee capsule enters into a making cavity of the brewing assembly to brew coffee; and
   when the brewing assembly and the brewing seat are moving apart from each other again, the coffee capsule having been brewed will drop from an interval between the brewing seat and the brewing assembly as the interval increases, and each detent member is rotated inwardly by the corresponding rotating member to its original position.

2. The capsule coffee machine according to claim 1, wherein the making cavity of the brewing assembly is provided therein with a resilient member used for popping up the coffee capsule.

3. The capsule coffee machine according to claim 2, wherein said resilient member is configured to be compressed when the brewing assembly and the brewing seat are moving towards each other, and to pop up the coffee capsule through restoring force when the brewing assembly (10) and the brewing seat are moving apart from each other again.

4. The capsule coffee machine according to claim 3, wherein a relative opening-closing movement between the brewing assembly and the brewing seat is driven by a driving assembly, which comprises a handle;
   wherein one end of said handle is a free end, and a middle part of the other end is connected with a hinge block, which is connected with the brewing seat through a first shaft; and
   wherein the other end of said handle is connected with one end of a first connecting rod through a second shaft, the other end of said first connecting rod is connected with one end of each of the two second connecting rods arranged at each of the two sides of the brewing seat respectively through a third shaft, and the other end of each of the two second connecting rods is connected with the brewing assembly.

5. The capsule coffee machine according to claim 4, wherein each said second connecting rod is connected with the third shaft though a connecting block, one end of said connecting block being connected with the third shaft in a rotatable manner, and the other end of said connecting block being hinged to the second connecting rod.

6. The capsule coffee machine according to claim 5, wherein the limit structure of said rotating member is a waist-shaped hole, and the other end of said detent member being provided with a slipping shaft which can move in the waist-shaped hole.

7. The capsule coffee machine according to claim 6, wherein said detent member is C-shaped, and is provided with a holding groove used for holding the coffee capsule.

8. The capsule coffee machine according to claim 7, wherein each of the two sides of the upper end of said brewing assembly is provided with a fixing block respectively, each said fixing block being connected with a first pin, with which said rotating member is connected in a rotatable manner.

9. The capsule coffee machine according to claim 8,
   wherein when the brewing assembly and the brewing seat are moving apart from each other, the first pin follows the brewing assembly and moves apart from the brewing seat, and each detent member is rotated inwardly when a corresponding rotating member rotates inwardly about the first pin;
   when the brewing assembly and the brewing seat are moving towards each other, the first pin follows the brewing assembly (10) and moves towards the brewing seat, and each detent member is rotated outwardly when a corresponding rotating member rotates outwardly about the first pin; and
   when the brewing assembly and the brewing seat are moving apart from each other again, the first pin follows the brewing assembly and moves apart from the brewing seat again, and each detent member is rotated inwardly to its original position when a corresponding rotating member rotates inwardly about the first pin.

10. The capsule coffee machine according to claim 2, wherein a relative opening-closing movement between the brewing assembly and the brewing seat is driven by a driving assembly, which comprises a handle;
   wherein one end of said handle is a free end, and a middle part of the other end is connected with a hinge block, which is connected with the brewing seat through a first shaft; and
   wherein the other end of said handle is connected with one end of a first connecting rod through a second shaft, the other end of said first connecting rod is connected with one end of each of the two second connecting rods arranged at each of the two sides of the brewing seat respectively through a third shaft, and the other end of each of the two second connecting rods is connected with the brewing assembly.

11. The capsule coffee machine according to claim 10, wherein each said second connecting rod is connected with the third shaft though a connecting block, one end of said connecting block being connected with the third shaft in a rotatable manner, and the other end of said connecting block being hinged to the second connecting rod.

12. The capsule coffee machine according to claim 1, wherein a relative opening-closing movement between the brewing assembly and the brewing seat is driven by a driving assembly, which comprises a handle;
   wherein one end of said handle is a free end, and a middle part of the other end is connected with a hinge block, which is connected with the brewing seat through a first shaft; and wherein the other end of said handle is connected with one end of a first connecting rod through a second shaft, the other end of said first connecting rod is connected with one end of each of the two second connecting rods arranged at each of the two sides of the brewing seat respectively through a third shaft, and the other end of each of the two second connecting rods is connected with the brewing assembly.

13. The capsule coffee machine according to claim 12, wherein each said second connecting rod is connected with the third shaft though a connecting block, one end of said connecting block being connected with the third shaft in a rotatable manner, and the other end of said connecting block being hinged to the second connecting rod.

14. The capsule coffee machine according to claim 1, wherein the limit structure of said rotating member is a waist shaped hole, and the other end of said detent member being provided with a slipping shaft which can move in the waist shaped hole.

15. The capsule coffee machine according to claim 1, wherein said detent member is C-shaped, and is provided with a holding groove used for holding the coffee capsule.

16. The capsule coffee machine according to claim 1, wherein each of the two sides of the upper end of said brewing assembly is provided with a fixing block respectively, each said fixing block being connected with a first pin, with which said rotating member is connected in a rotatable manner.

17. The capsule coffee machine according to claim 16,
wherein when the brewing assembly and the brewing seat are moving apart from each other, the first pin follows the brewing assembly and moves apart from the brewing seat, and each detent member is rotated inwardly when a corresponding rotating member rotates inwardly about the first pin;
when the brewing assembly and the brewing seat (9) are moving towards each other, the first pin follows the brewing assembly and moves towards the brewing seat, and each detent member is rotated outwardly when a corresponding rotating member rotates outwardly about the first pin; and
when the brewing assembly and the brewing seat are moving apart from each other again, the first pin follows the brewing assembly and moves apart from the brewing seat again, and each detent member is rotated inwardly to its original position when a corresponding rotating member rotates inwardly about the first pin.

18. The capsule coffee machine according to claim 1, wherein said brewing seat is provided with two limit blocks for limiting said two detent members respectively, each of said limit blocks being connected with a second pin, which is sheathed with a middle part of said detent member that is connected with the second pin in a rotatable manner.

19. The capsule coffee machine according to claim 18, wherein said second pin is sheathed with a torsion spring for resetting the detent member, one end of said torsion spring being connected with the limit block, and the other end of said torsion spring being connected with the detent member.

20. The capsule coffee machine according to claim 19,
wherein when the brewing assembly and the brewing seat are moving apart from each other, each detent member rotates inwardly about the second pin to the detent location and thus is limited by the inner side of the corresponding limit block;
when the brewing assembly and the brewing seat are moving towards each other, each detent member rotates outwardly about the second pin, so that the torsion spring is compressed, and each detent member is limited by the outer side of the corresponding limit block; and
when the brewing assembly and the brewing seat are moving apart from each other again, each detent member rotates inwardly about the second pin to its original position and is limited by the inner side of the corresponding limit block by the action of the restoring force of the corresponding torsion spring and rotating member.

* * * * *